US012728867B2

(12) United States Patent
Payen

(10) Patent No.: US 12,728,867 B2
(45) Date of Patent: Sep. 8, 2026

(54) METHOD FOR MANAGING A GEAR SHIFT IN A GEARBOX

(71) Applicant: Schaeffler Technologies AG & Co. KG, Herzogenaurach (DE)

(72) Inventor: Julien Payen, Tournefeuille (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/235,016

(22) Filed: Jun. 11, 2025

(65) Prior Publication Data

US 2026/0028029 A1 Jan. 29, 2026

(30) Foreign Application Priority Data

Jul. 23, 2024 (FR) ...................................... 2408085

(51) Int. Cl.
*B60W 10/06* (2006.01)
*B60W 10/11* (2012.01)
(Continued)

(52) U.S. Cl.
CPC ............ *B60W 30/19* (2013.01); *B60W 10/06* (2013.01); *B60W 10/11* (2013.01);
(Continued)

(58) Field of Classification Search
CPC ........ B60W 30/19; B60W 2300/36–2300/367; F16H 63/50; F16H 63/502; F16H 59/044;
(Continued)

(56) References Cited

U.S. PATENT DOCUMENTS 4,270,414 A * 6/1981 Tellert ...................... F02P 11/02 477/103
4,491,031 A 1/1985 Ooka
(Continued)

FOREIGN PATENT DOCUMENTS

CN 115727126 A 3/2023
CN 116044983 A * 5/2023 ......... F16H 61/0204
(Continued)

OTHER PUBLICATIONS

French Search Report for FR2408085, dated Jan. 22, 2025, 6 pages.

*Primary Examiner* — Sherry L Estremsky
(74) *Attorney, Agent, or Firm* — NIXON & VANDERHYE

(57) ABSTRACT

A control method for managing an upshift in a gearbox, the shift being intended to transition from a starting gear to a target gear, without declutching, the gearbox comprising a selection shaft movable between a first position corresponding to the starting gear and a second position corresponding to the target gear, an angular position sensor providing a voltage value corresponding to a current angular position of the selection shaft, the method comprising:

iteratively acquiring the voltage value corresponding to the angular position of the selection shaft;

when the current voltage value (61) becomes greater than a first predetermined threshold (VS1), then triggering a reduction in the engine torque;

when the current voltage value increases and becomes greater than a second predetermined threshold (VS2), then cancelling the reduction in engine torque.

9 Claims, 3 Drawing Sheets

(51) Int. Cl.
*B60W 30/19* (2012.01)
*F16H 63/50* (2006.01)

(52) U.S. Cl.
CPC . *B60W 2510/0657* (2013.01); *B60W 2510/10* (2013.01); *B60W 2710/0666* (2013.01); *B60W 2710/1005* (2013.01); *F16H 63/50* (2013.01)

(58) Field of Classification Search
CPC ...... F16H 59/0217; F16H 63/16; F16H 63/18; F16H 2059/0234; F02D 41/0225
See application file for complete search history.

(56) References Cited

U.S. PATENT DOCUMENTS 5,079,969 A * 1/1992 Kato ....................... F16H 59/16 477/109
7,351,185 B2 * 4/2008 Kobayashi ............ F16H 63/502 477/109
7,568,403 B2 * 8/2009 Matsuda ................. F16H 59/68 74/335
7,810,621 B2 10/2010 Zenno
7,846,062 B2 * 12/2010 Watanabe ............. B60W 10/06 477/109
8,888,654 B2 11/2014 Iizuka
8,948,985 B2 2/2015 Sakamoto et al.
9,945,477 B2 * 4/2018 Nakamura .............. F16H 63/16
10,598,275 B2 * 3/2020 Seimann ............... B60W 30/19
11,377,109 B2 * 7/2022 Thomas .................. F16H 63/18
11,529,943 B2 12/2022 Terai et al.
2008/0119324 A1 5/2008 Watanabe
2015/0184745 A1 7/2015 Arai et al.
2015/0329011 A1 * 11/2015 Kawai ................... B60W 30/19 701/22
2019/0264803 A1 8/2019 Matsukawa et al.

FOREIGN PATENT DOCUMENTS

DE 102024107886 A1 * 10/2024 ......... F16H 61/0437
EP 3495255 A1 * 6/2019 ........... F16H 59/044
JP 2001140668 A * 5/2001
JP 2019099074 A 6/2019

* cited by examiner

[Fig. 1]
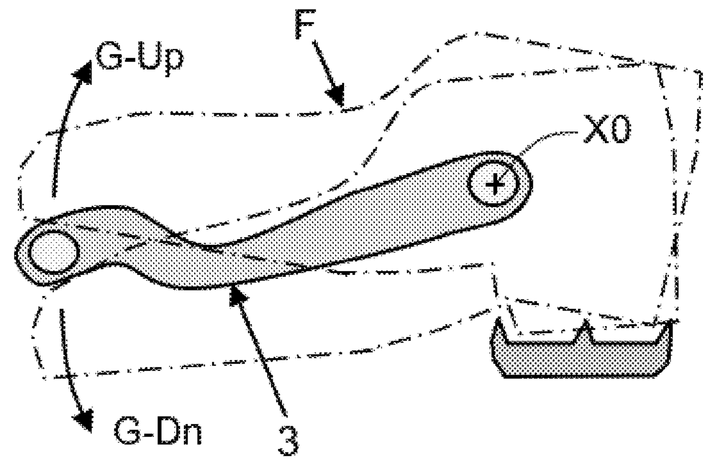
[Fig. 2]
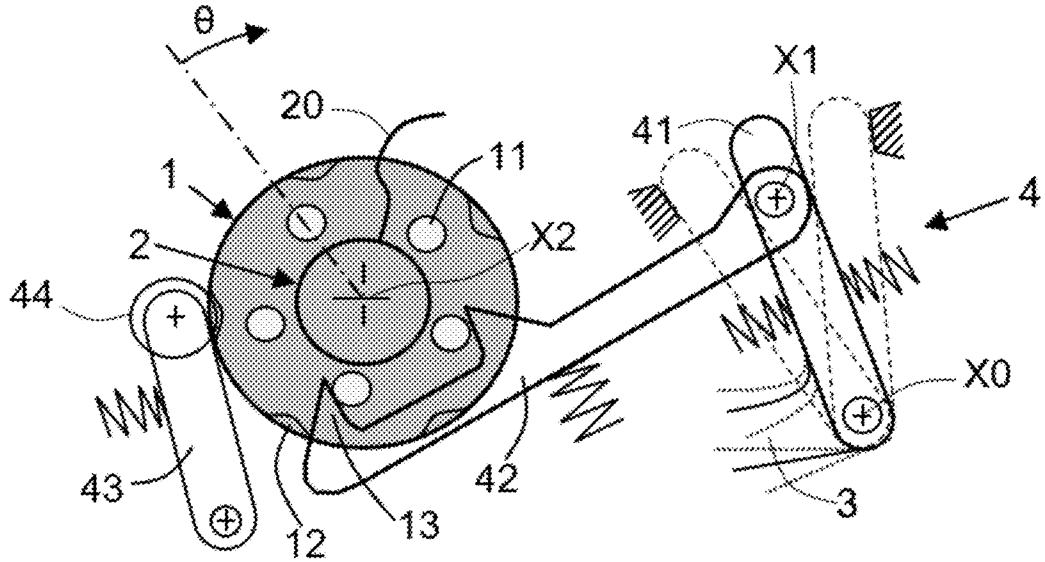

[Fig. 3]
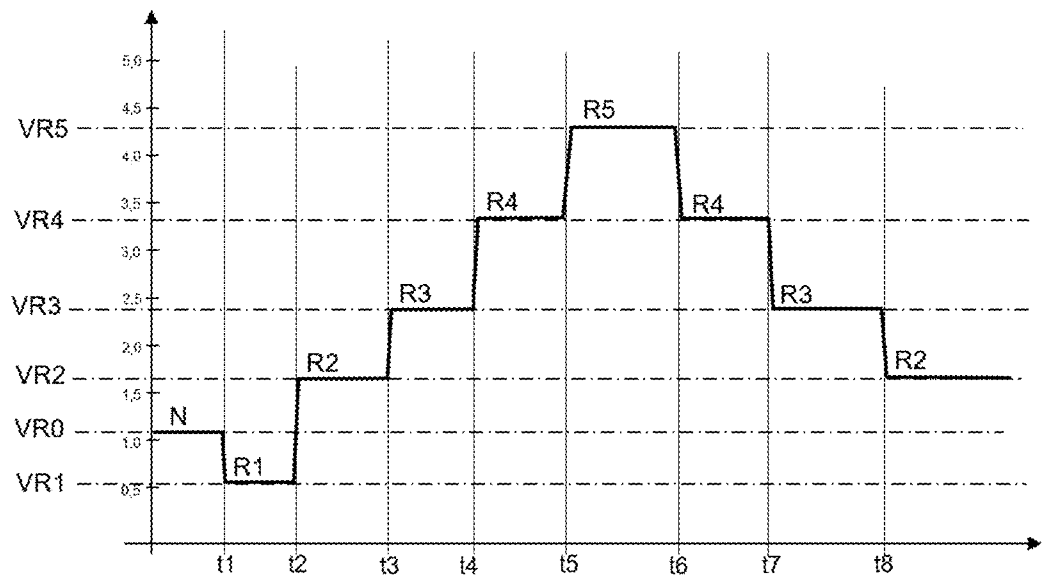
[Fig. 4]
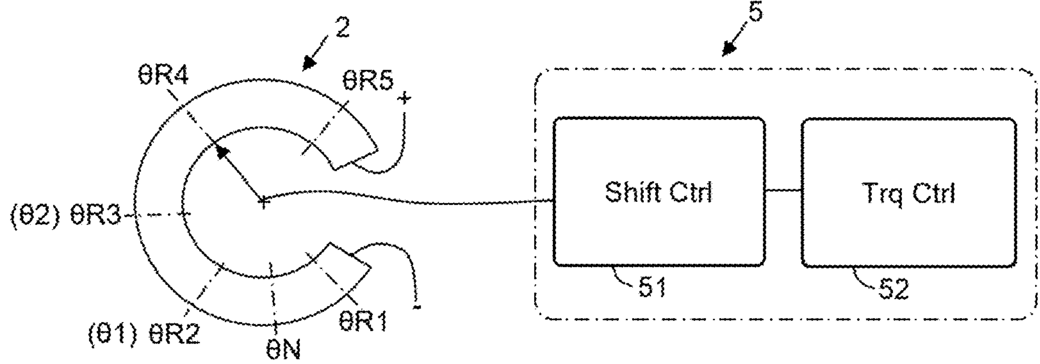

[Fig. 5]
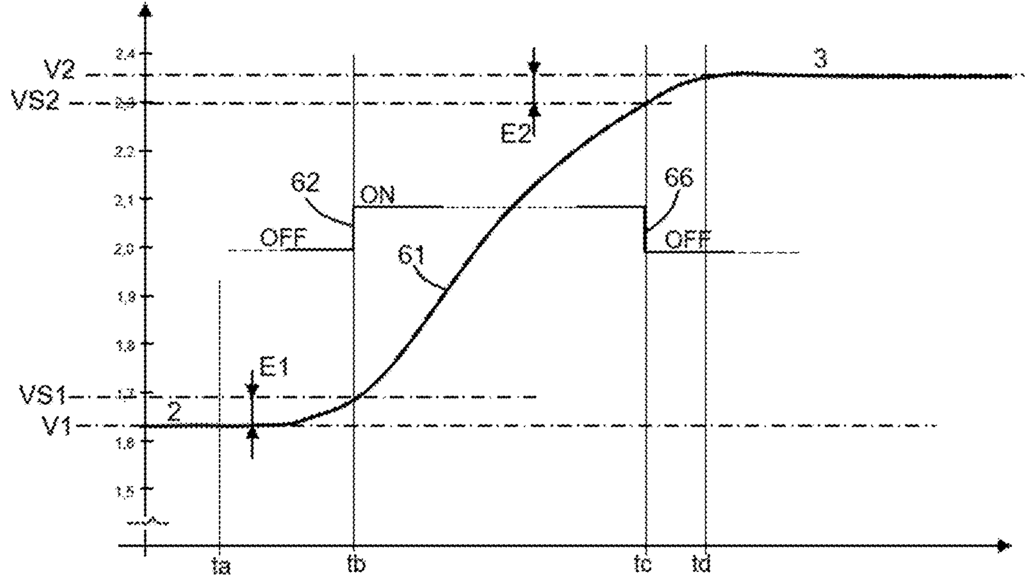
[Fig. 6]
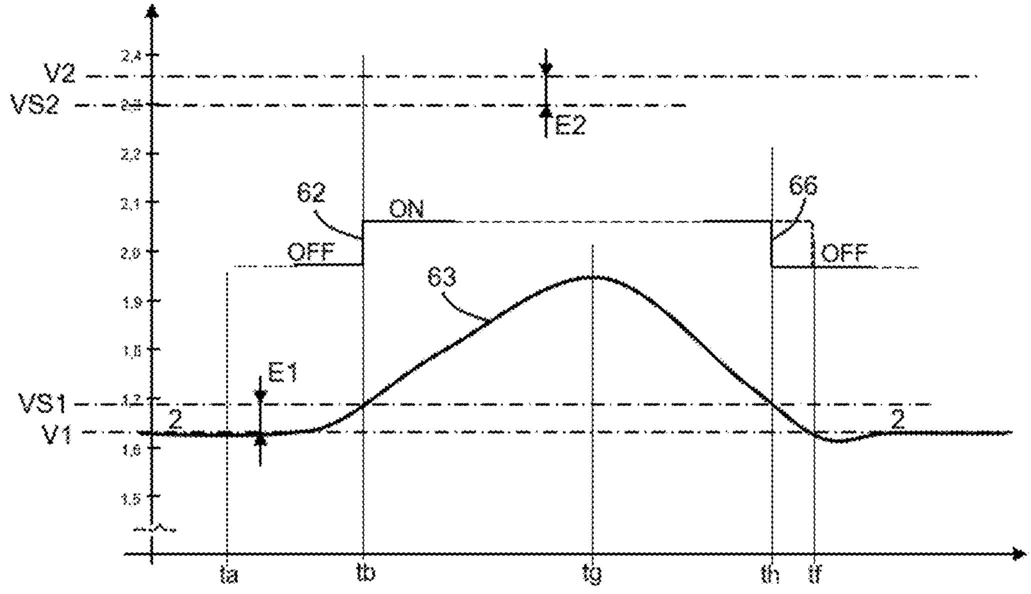

METHOD FOR MANAGING A GEAR SHIFT IN A GEARBOX

CROSS-REFERENCE TO RELATED APPLICATION

This application claims priority to French Application No. 2408085 filed Jul. 23, 2024, the entire contents of which are hereby incorporated by reference.

The present invention relates to a control method for managing a gear shift in a gearbox of a movable vehicle with an engine.

The present invention is particularly applicable to movable vehicles such as motorbikes or off-road motorbikes. The movable vehicles in question can have two wheels, three wheels or even four wheels ('quads').

The movable vehicle that the present invention is applied to comprises a gearbox with manual gear shifting, i.e., gear shifting is not automatic.

The gearbox is a gearbox with discrete gears, each having a predetermined reduction ratio, i.e., it is not a continuously variable transmission ('variator').

The movable vehicle that the present invention is applied to comprises a gear selection shaft and an angular position sensor providing a voltage value corresponding to a current angular position of the selection shaft.

The engine, which in this case is an internal combustion engine, can be a 4-stroke or a 2-stroke engine, the engine also can be a one-cylinder or two-cylinder engine, without excluding other configurations.

According to a very common configuration, the gear shift is controlled by the foot of the driver, in this case the left foot, by activating a gear shift lever.

In this case, quick gear shifting is of interest, notably a gear shift without declutching. In practice, the driver operates the gear shift lever with their foot without using their hand to operate the clutch control.

The advantage of fast gear shifting is particularly important for upshifting when the vehicle is accelerating.

It is known for the aforementioned sensor to detect the start of the gear shift sequence and to reduce or cancel the engine torque for a predefined period, notably to allow the engine speed to drop, so that the next highest gear can be engaged quickly and easily.

Even if the aforementioned predefined period can be taken from a calibration table, it does not take into account certain variations, such as component ageing, operating differences between several users of the vehicle, as well as the presence of certain types of play that differ from one vehicle to another, even though they are theoretically identical.

The inventors have attempted to improve the situation, notably in order to refine the duration of the reduction or cancellation of the engine torque to the minimum necessary for the upshift sequence.

To this end, a control method is proposed for managing an upshift in a gearbox of a movable vehicle having an engine, the shift being intended to transition from a starting gear to a target gear, wherein the gearbox comprises a selection shaft movable between a first stable position corresponding to the starting gear and a second stable position corresponding to the target gear, wherein the gearbox comprises an angular position sensor for the selection shaft providing a voltage value corresponding to a current angular position of the selection shaft, the method comprising:

- an acquisition step, in which the voltage value corresponding to the angular position of the selection shaft is acquired iteratively;
- an engine torque reduction step, in which, when, starting from a first reference value corresponding to the first stable position of the selection shaft, the current voltage value increases and becomes greater than a first predetermined threshold, then a reduction in the engine torque is triggered, with the first predetermined threshold exceeding the first reference value by a first difference;
- an engine torque restoration step, in which, when the current voltage value increases and becomes greater than a second predetermined threshold, then the engine torque reduction is cancelled and the requested engine torque is applied;
- with the second predetermined threshold being separated by a second difference and being below a second reference value corresponding to the second stable position of the selection shaft.

By virtue of these provisions, notably the engine torque restoration step, it is possible to shorten the duration for reducing or cancelling the engine torque. This is beneficial for the driving comfort of the vehicle and enhances the perception of the driver in terms of responsiveness.

Shortening the cut-off time is beneficial for reducing pollutant emissions.

By virtue of the method proposed herein, the torque cut-off time is adjusted to the minimum necessary.

In practice, as soon as the selection shaft leaves the stable position corresponding to the starting gear, the engine torque is reduced or cancelled and, conversely, as soon as the selection shaft approaches the stable position corresponding to the target gear, the torque is restored.

Advantageously, there is no need to wait for a predefined period to elapse before restoring the requested torque; it is restored as soon as the target gear is at least partially engaged.

It should be noted that the terms 'first' and 'second' above do not only cover the case of shifting from first gear to second gear, but also all cases of shifts to higher gears. It is therefore understood that the target gear is immediately above the starting gear, for example, a target gear R4 with a starting gear R3, or, in another example, a target gear R3 with a starting gear R2.

It should be noted that the notion of "torque reduction" encompasses a substantial reduction in torque or the complete cancellation of torque.

The expression "the second predetermined threshold being separated by a second difference and being below a second reference value" should be understood to mean that the second predetermined threshold is below the second reference value, and the second threshold is separated from the second reference value by the second difference.

According to one embodiment, when, after the engine torque reduction step has been carried out, the current voltage value does not reach the second predetermined threshold and once again returns to the first predetermined threshold, then the engine torque reduction is cancelled and the requested engine torque is applied.

In this way, if an incomplete maneuver is undertaken by the driver and this triggers a torque cut-off, the torque is restored after the initially programmed time has elapsed.

Similarly, if an object strikes the gear shift lever and causes it to move slightly, triggering the torque that is normally intended for a gear shift to be cut-off, the normal situation is restored after the initially programmed time has elapsed.

It also should be noted that if the proposed strategy for shortening the torque cut-off time does not work for any reason, the predefined period will still lead to the restoration of the engine torque when it has elapsed.

According to one embodiment, the first difference ranges between 5% and 15% of the difference between the second reference value and the first reference value.

As soon as the selection shaft leaves the first stable position, then this is interpreted as the start of a gear shift sequence. The first difference is small enough to allow early detection. The anticipated torque cut-off also helps to facilitate the disengagement of the starting gear.

According to one embodiment, the second difference ranges between 5% and 15% of the difference between the second reference value and the first reference value.

As soon as the second reference value is approached, the torque requested by the driver is restored. This means that, in practice, as soon as the target gear is at least partially engaged, the torque is restored in order to minimize the duration for which the torque has been reduced or cancelled. This thus increases the responsiveness of the system.

According to one option, the acquisition step includes an acquisition frequency of at least 100 Hz, or even 1 kHz.

In this way, a sample is provided of the value at least every 1 ms. It is thus possible to advantageously respond in real-time for transition sequences that typically can last a few tens of milliseconds.

According to one embodiment, the first stable position of the selection shaft either corresponds to the second gear ratio, or to the third gear ratio, or to the fourth gear ratio, and the first reference value respectively corresponds to the second, third and fourth gear voltages.

The proposed method thus can be applied to all upshifts from first gear to the highest gear.

According to one embodiment, at least the second, third and fourth gear voltages are taken from a calibration table and are adjusted by learning.

By virtue of the mechanical indexing of each gear position, the responsible control unit can be programmed to consider a stable voltage value as corresponding to the voltage of the engaged gear. On this basis, the control unit can adjust the value initially present in the calibration table.

It is thus possible to take into account certain drifts in mechanical components or play that develop with ageing. Initial learning and additional learning adjustments also can be provided from time to time.

A further aim of the present invention is a computer configured to implement the method as defined above.

A further aim of the present invention is a computer program product, preferably stored on a non-transient storage medium, comprising instructions which, when they are implemented by at least one processor of the computer, execute the method as defined above.

A further aim of the present invention is a control system for managing an upshift in a gearbox of a movable vehicle having an engine, the gearbox comprising a selection shaft, an angular position sensor for the selection shaft providing a voltage value corresponding to a current angular position of the selection shaft, and a gearbox gear shift lever, the control system comprising a computer configured to implement the method as described above.

According to one embodiment, the gearbox gear shift lever is connected to the selection shaft by a linkage mechanism. The gear shift lever is external, i.e., accessible by foot, and is of the pulsed type, with the linking mechanism converting a pulsed movement into a rotation of the selection shaft from a stable starting position to a stable target position, which corresponds to a gear shift.

According to one embodiment, the angular position sensor is a potentiometric sensor. This is a simple and reliable solution that is easy to implement electronically.

The invention will be described in further detail through the description of non-limiting embodiments and based on the appended figures, which illustrate variants of the invention, and in which:

FIG. 1 schematically illustrates an area of the gear shift lever on a motorbike;

FIG. 2 schematically illustrates an example of a mechanism for controlling the rotation of a selection shaft in a motorbike gearbox;

FIG. 3 illustrates a gear shift timing diagram;

FIG. 4 shows a functional diagram of the control system used in the present invention;

FIG. 5 illustrates an example of a timing diagram for shifting from one gear to another, in this case between 2nd gear and 3rd gear;

FIG. 6 illustrates another example of a timing diagram.

The same references denote identical or similar elements throughout the various figures. For the sake of the clarity of the disclosure, some elements are not necessarily shown to scale.

The present invention is particularly applicable to movable vehicles such as motorbikes or off-road motorbikes. The movable vehicles in question can have two wheels, three wheels or even four wheels ('quads').

The application has been illustrated on a motorbike with a manually operated gearbox.

In the illustrated example, the gearbox has five gears, denoted R1, R2, R3, R4 and R5, respectively. Of course, the invention is also applicable to configurations with less than five gears or with more than five gears.

As is known per se, the gearbox comprises forks that move sliding gears for meshing the sprockets. The position of the forks is controlled by a gear selection shaft 1.

According to one embodiment, an angular position sensor 2 is provided, with the rotating part connected to the gear selection shaft 1 in a rotationally fixed manner and the sensor body being stationary.

The angular position sensor 2 provides a voltage value corresponding to the current angular position of the selection shaft.

With reference to FIG. 2, the angular position sensor 2 is arranged at the end of the selection shaft.

The angular position sensor 2 is electrically connected to a control unit, also called computer, discussed below, by electrical conductors 20.

The angular position sensor 2 is an analogue sensor. In the illustrated example, the angular position sensor 2 is a potentiometric sensor. It covers an angular range close to 360°. It could cover a less extensive range.

Other types of sensors also can be used, provided that their output resembles an analogue value that assumes several distinct values depending on the respective engaged gear.

The angular position sensor can be installed on an auxiliary wheel engaged with the selection shaft. Irrespective of the sensor technology or the sensor installation configuration, the angular position sensor directly or indirectly provides an image of the angular position of the selection shaft.

The motorbike is equipped with a gear shift lever 3 for shifting gears in the gearbox.

The gear shift lever 3 is connected to the gear selection shaft 1 via a linking mechanism 4.

As is well known and can be seen in FIG. 1, the gear shift lever 3 is moved by the foot F of the driver either upwards (G-up) or downwards (G-Dn) depending on whether the driver wishes to shift to a higher or lower gear.

The gear shift lever 3 is rotatably mounted around the axis X0.

The gear shift lever 3 is of the pulsed type, i.e., the gear shift lever returns to a rest position when not activated by the foot of the driver.

The gear shift lever 3 cooperates with the selection shaft by means of the linking mechanism 4, a simplified version of which is shown in FIG. 2.

A first connecting rod 41 is rotatably connected to the gear shift lever 3, rotating around the axis X0. A second connecting rod 42 is connected to the first connecting rod 41 by a pivot connection on the axis X1. The second connecting rod 42 comprises teeth 13 configured to engage the pins 11.

The gear selection shaft 1 is rotatably mounted on the gearbox housing relative to the axis X2.

The gear selection shaft 1 comprises pins 11 activated by the second connecting rod 42 and indexing recesses 12.

A third connecting rod 43 with a roller 44 indexes the specific positions of the gears of the gear selection shaft 1, with the roller 44 fitting into the indexing recesses 12.

For a more complete understanding of the gear selection shaft 1 and of the linking mechanism 4, the reader can refer to documents U.S. Pat. Nos. 3,421,384 and 4,491,031.

The gear selection shaft is sometimes called 'selection drum' or 'selection barrel'. The gear selection shaft 1 comprises generally annular grooves that allow the forks to be moved axially, i.e., along the axis X2, by a cam effect.

The timing diagram in FIG. 3 illustrates a complete driving phase from zero speed with the gearbox in neutral N to 5th gear and back to 2nd gear.

More specifically, from the start until the time t1, the gearbox is in neutral N, then from the time t1 to the time t2, first gear R1 is engaged, then from the time t2 to the time t3, second gear R2 is engaged, then from the time t3 to the time t4, third gear R3 is engaged, then from the time t4 to the time t5, fourth gear R4 is engaged, and finally, at the time t5, fifth gear R5 is engaged. The times t6, t7 and t8 correspond to downshifts (R5 to R2).

It can be seen that the voltage provided by the sensor changes in steps, with each step (VR0, VR1, VR2, VR3, VR4, VR5) corresponding to a particular angular position of the selection shaft (θN, θR1, θR2, θR3, θR4, θR5, see FIG. 4).

Furthermore, each step corresponds to a particular gear of the gearbox. It is thus possible to display the engaged gear on the instrument panel at any time.

In the illustrated example, the value provided by the angular position sensor 2 when the gearbox is in neutral N is around 1.1 volts. When the gearbox is in gear R1, the voltage value VR1 is around 0.6 V. When the gearbox is in gear R2, the voltage value VR2 is around 1.7 V. When the gearbox is in gear R3, the voltage value VR3 is around 2.4 V. When the gearbox is in gear R4, the voltage value VR4 is around 3.3 V. When the gearbox is in gear R5, the voltage value VR5 is around 4.3 V. These reference voltages are also called 'gear voltages' in this document.

As can be seen in FIG. 4, the control system that is involved in this case comprises a control unit 5 that comprises at least one first functional block 51 (acronym 'Shift CTrl') responsible for shifting the gearbox gear and a second functional block 52 (acronym 'Trq CTrl') responsible for computing and applying torque through the engine (internal combustion engine in this case).

The control unit 5 ('computer') continuously acquires the voltage provided by the angular position sensor 2.

The acquisition step is carried out at an acquisition frequency of at least 100 Hz. This sampling provides at least one value every 10 milliseconds for the voltage provided by the sensor.

A gear upshift without declutching in practice typically lasts for a few tens of milliseconds.

Reference will now be made to FIG. 5, which provides a detailed view of a shift from a starting gear to a target gear, in the example illustrated in this case this involves a shift from 2nd gear to 3rd gear. Of course, the depiction applies, mutatis mutandis, to shifts R3→R4, R4→R5, R5→R6, where applicable.

Starting, at the time ta, from a first reference value V1 corresponding to the first stable position θ1 of the selection shaft, a second reference value V2 is obtained at the end of the shift sequence that corresponds to the second stable position θ2 of the selection shaft (target position).

If the starting gear is the 2nd gear, then V1=VR2 and θ1=θR2, and also V2=VR3 and θ2=θR3. If the starting gear is the 3rd gear, then V1=VR3, θ1=θR3, V2=VR4 and θ2=θR4.

The proposed method includes an engine torque reduction step, whereby, when the current voltage value 61 increases and becomes greater than a first predetermined threshold VS1, then an engine torque reduction is triggered (transition 62 at the time tb, OFF to ON).

For the sake of the brevity of the disclosure, the Boolean torque reduction output, i.e., ON or OFF, is shown at mid-height and in the middle of the timing diagram.

The first predetermined threshold VS1 exceeds the first reference value V1 by a first difference E1. For example, the first difference E1 can be selected so as to range between 5% and 15% of the difference between the second reference value V2 and the first reference value V1. For example, E1 can be of the order of 20 mV to 60 mV.

For example, in the illustrated example, the first predetermined threshold VS1 amounts to 1.7 volts. E1 can be selected between 5% of (V2-V1) and 15% of (V2-V1), for example, 10% of (V2-V1).

At the time td, the selection shaft 1 is indexed to the position of the target gear, in this case 3rd gear.

Advantageously, the proposed method provides an engine torque restoration step, in which, when the current voltage value 61 increases further and becomes greater than a second predetermined threshold VS2, then the engine torque reduction is cancelled and the requested engine torque is applied (transition 66 at the time tc).

The second predetermined threshold VS2 is below V2. A second difference E2 separates the second reference value V2 from the second predetermined threshold VS2.

The second difference E2 ranges between 5% and 15% of the difference between the second reference value V2 and the first reference value V1. E2 can be selected between 5% of (V2-V1) and 15% of (V2-V1), for example, 10% of (V2-V1).

The differences E1 and E2 can have identical or different values. The differences E1 and E2 can be managed in a calibration table.

FIG. 6 illustrates an example where the shift is not completed but an incomplete action is nevertheless performed by the selection shaft, which is shifted from its idle position but does not reach the target position and returns to the starting position.

The time tg corresponds to the maximum voltage value 63 provided by the sensor during this aborted gear shift sequence. After turning, the selection shaft returns to the starting position.

At the time th, the value provided by the sensor falls back below the first predetermined threshold VS1. At this point, the engine torque reduction is cancelled and the requested engine torque is applied (transition 66 at the time th).

It should be noted that, in another alternative implementation, it is at the time tf, when the voltage value crosses the reference value V1 again, that the torque is restored (dashed line).

It should be noted that the first, second, third, fourth and fifth gear voltages (VR1, VR2, VR3, VR4, VR5) are taken from a calibration table. They can be adjusted by learning, in relation to the indexing of the gear positions as explained above.

The engine torque can be momentarily cut off for a certain number of engine cycles by inhibiting the ignition command and cancelling the fuel injection command.

The invention claimed is:

1. A control method for managing an upshift in a gearbox of a movable vehicle having an engine, the shift being intended to transition from a starting gear to a target gear, wherein the gearbox comprises a selection shaft (1) movable between a first stable position (θ1) corresponding to the starting gear and a second stable position (θ2) corresponding to the target gear, wherein the gearbox comprises an angular position sensor (2) for the selection shaft providing a voltage value (61) corresponding to a current angular position of the selection shaft, the method comprising:

an acquisition step, in which the voltage value corresponding to the angular position of the selection shaft is acquired iteratively;

an engine torque reduction step, in which, when, starting from a first reference value (V1) corresponding to the first stable position (θ1) of the selection shaft, the current voltage value increases and becomes greater than a first predetermined threshold (VS1), then a reduction in the engine torque is triggered, with the first predetermined threshold (VS1) exceeding the first reference value (V1) by a first difference (E1);

an engine torque restoration step, in which, when the current voltage value increases and becomes greater than a second predetermined threshold (VS2), then the engine torque reduction is cancelled and the requested engine torque is applied;

with the second predetermined threshold (VS2) being separated by a second difference (E2) and being below a second reference value (V2) corresponding to the second stable position (θ2) of the selection shaft;

wherein the first difference (E1) ranges between 5% and 15% of the difference between the second reference value (V2) and the first reference value (V1).

2. The method as claimed in claim 1, wherein, when, after the engine torque reduction step has been carried out, the current voltage value does not reach the second predetermined threshold (VS2) and once again returns to the first predetermined threshold (VS1), then the engine torque reduction is cancelled and the requested engine torque is applied.

3. The method as claimed in claim 1, wherein the second difference (E2) ranges between 5% and 15% of the difference between the second reference value (V2) and the first reference value (V1).

4. The method as claimed in claim 1, wherein the acquisition step comprises an acquisition frequency of at least 100 Hz.

5. The method as claimed in claim 1, wherein the first stable position (θ1) of the selection shaft either corresponds to the second gear ratio, or to the third gear ratio, or to the fourth gear ratio, and the first reference value (V1) respectively corresponds to the second, third and fourth gear voltages (VR2, VR3, VR4).

6. The method as claimed in claim 5, wherein at least the second, third and fourth gear voltages are taken from a calibration table and are adjusted by learning.

7. A computer configured to implement the method as claimed in claim 1.

8. A computer program product, stored on a non-transient storage medium, comprising instructions which, when they are implemented by at least one processor of a computer, execute the method as claimed in claim 1.

9. A control system for managing an upshift in a gearbox of a movable vehicle having an engine, the gearbox comprising a selection shaft (1), an angular position sensor (2) for the selection shaft providing a voltage value corresponding to a current angular position of the selection shaft, and a gearbox gear shift lever (3), the control system comprising a computer (5) configured to implement the method as claimed in claim 1.

* * * * *